Sept. 1, 1936. J. V. CAPUTO 2,052,963
CONTINUOUS ELECTRIC WELDING MACHINE
Filed May 17, 1930 3 Sheets-Sheet 2

INVENTOR
James V. Caputo
by his attorneys
Byrnes, Stebbins, Parmelee & Blenko

Sept. 1, 1936.  J. V. CAPUTO  2,052,963
CONTINUOUS ELECTRIC WELDING MACHINE
Filed May 17, 1930  3 Sheets-Sheet 3

INVENTOR
James V. Caputo
by his attorneys
Byrnes, Stebbins, Parmelee & Blenko

Patented Sept. 1, 1936

2,052,963

UNITED STATES PATENT OFFICE 2,052,963

CONTINUOUS ELECTRIC WELDING MACHINE

James V. Caputo, Girard, Ohio

Application May 17, 1930, Serial No. 453,185

39 Claims. (Cl. 219—6)

My invention relates to a machine for welding a metal blank and, in particular, to an electric welding machine for the manufacture of pipe.

In the manufacture of pipe by the continuous electric welding process as known heretofore, considerable difficulty has been experienced in supplying welding current to the welding roll contacting with abutting edges of the blank to be welded. Because of the heavy currents involved, the use of brushes is not satisfactory. It has been proposed heretofore to employ alternating current for welding and to utilize a step-down transformer mounted for rotation with a welding roll for supplying welding current thereto. In machines of this character now known, the transformer windings are almost entirely inaccessible, the machines are not highly efficient and many other objections to their use have been encountered. The reactance of the secondary circuits has been very great and only a small portion of the secondary voltage was actually useful in welding.

I have invented a welding machine including a rotary transforming device having its windings arranged for easy access, the device being constructed for the highest efficiency and the whole machine having great mechanical strength. Another feature of the invention is that substantially all reactance drop in the secondary leads from the transformers to the welding roll is compensated so that the full secondary voltage is applied to the welding circuit, except for the slight resistance drop in the connections. Another feature of the invention is the provision of novel means for cooling the device. I have also provided a highly useful means for connecting the secondary windings to the welding roll so as to make good electrical contact therewith as well as to afford mechanical support therefor. Because of the high efficiency of the invention, the k. v. a. rating of the device may be much lower than that of other welding transformers.

According to the invention, I provide an electrode comprising a pair of conducting rolls insulated from each other and suitably grooved for receiving a formed blank for welding. A rotary transformer core of cylindrical shape is mounted on a spider carried by a rotatable shaft. Primary and secondary windings are placed in axial slots in the cylindrical core to form a plurality of independent transformers. The secondary windings are constituted by hair-pin loops of copper strap and the ends of the windings are extended and suitably machined for engagement with the welding rolls previously mentioned. The rolls are thus electrically connected to the transformer secondaries and also supported mechanically. For cooling the transformer core and windings, I may employ a separate source of air under pressure, or I may provide a fan on the shaft driven by an induction motor having its stator fixed thereto and its rotor rotatable thereon.

According to a modified form of the invention, the transformers for supplying welding current may have their cores independent of each other and secured to a common spider instead of being mechanically and magnetically a unit. This construction facilitates easy removal of any transformer for repair or replacement. The means for conducting the welding current to the blank is the same in both forms of the invention.

For a complete understanding of the invention, reference is made to the accompanying drawings illustrating a present preferred embodiment thereof. In the drawings:

Figure 4 is a perspective view of one of the secondary windings;

Figure 5 is a plan view of a detail;

Figure 8 is a side elevation of a further modified form of the invention.

Figure 1:
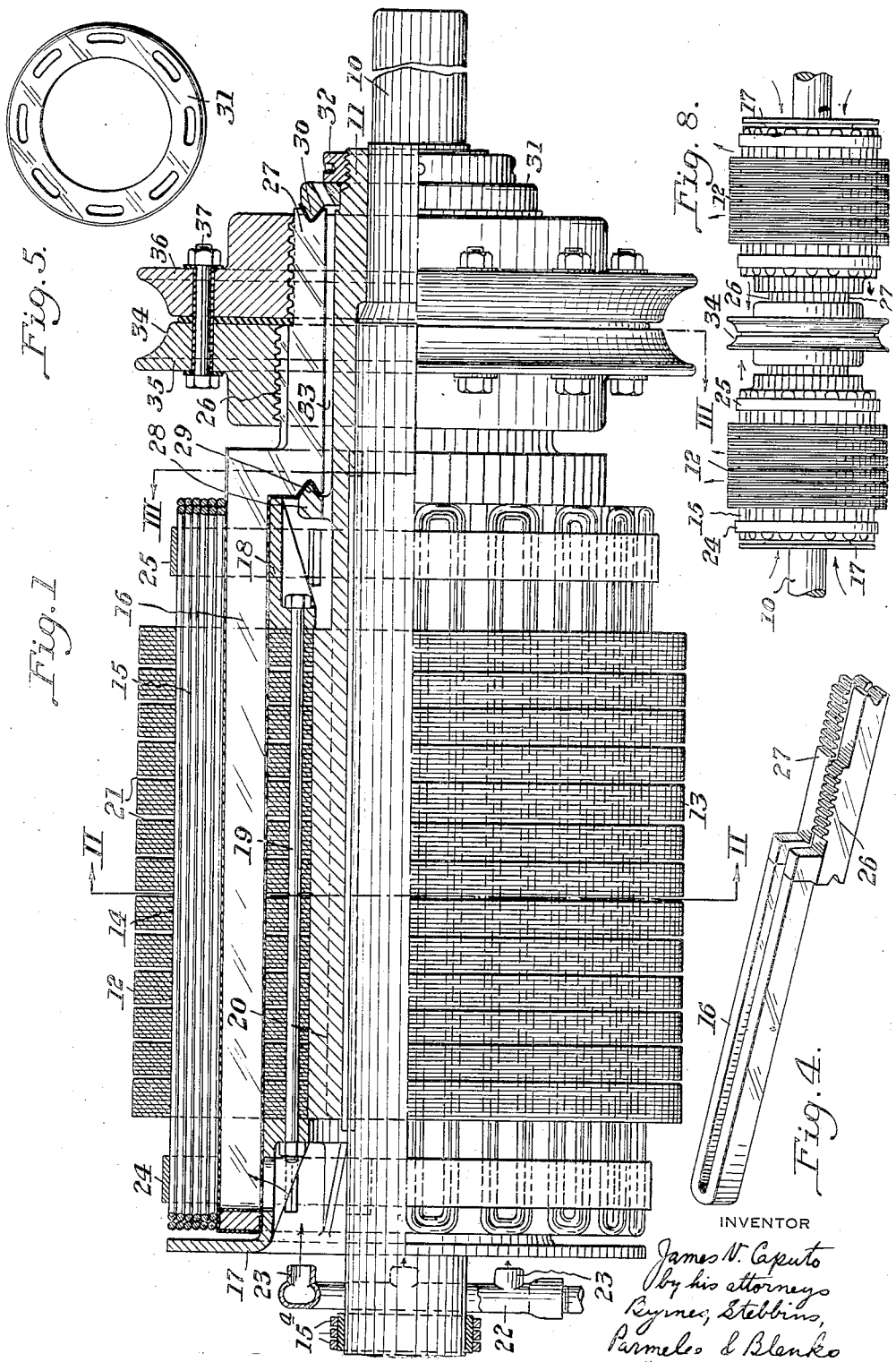
Figure 1 is a side elevation partly in section showing one form of the invention.
Figure 2:
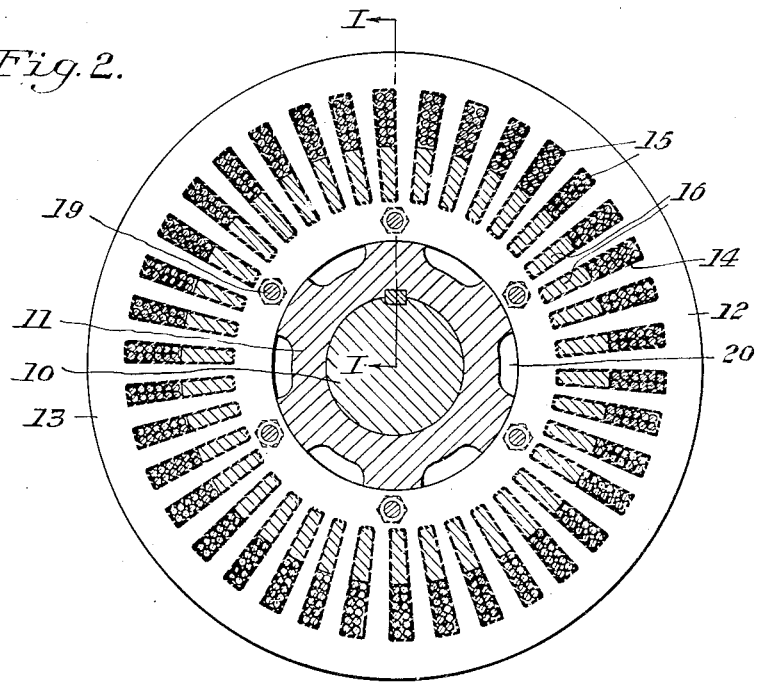
Figure 2 is a section along the plane of line II—II of Figure 1.

Referring in detail to the drawings and, for the present, to Figures 1 through 5, the welding machine of my invention comprises a shaft 10 to which is keyed a spider 11. The spider 11 affords a support for a rotary device 12, including a core 13 of drum shape having axial slots 14 therein. Primary windings 15 and secondary windings 16 are placed in the slots 14, and are suitably insulated from each other and from the core 13.

It will be apparent from the foregoing description that the drum core 13 and the plurality of windings 15 and 16 constitute a plurality of shell type transformers. The windings of each individual transformer, of course, pass through adjacent slots in the core 13. The device 12 may be built up by the use of preformed primary and secondary coils around which the punched laminations constituting the core are stacked in a manner well known in the electrical art. Since the secondary windings are a single turn of copper strap, they may be inserted in the slots after the core has been built up if desired, and then wedged in place. The primary windings may also be wound through the slots by hand after the core has been formed. The transformer may also be built up by providing separate punchings to form the portions of the core embracing the primary and secondary windings, respectively. These punchings may be similar to those employed in the construction of an induction motor. When the laminations have been assembled and the windings inserted, the two portions may be combined by pressing the inner portion within the outer portion and securing it thereto by any convenient means.

The ends of the stacked laminations forming the core 13 are engaged by brackets 17 and 18 which are drawn together by means of clamping rods 19, which also serve to secure the core to the spider 11. It will be noted that the spider 11 has axial channels 20 therein. The core 13 includes spacer elements (not shown) forming ducts 21 in the core. A ring-shaped conduit 22 having outlets 23 is arranged axially of the shaft 10 and is connected to a source of air under pressure. Air is thus blown through the transformer core axially and passes out of the conduits 21 to cool the core and windings of the transformer. Circumferential bands 24 and 25 are provided to maintain the windings in proper position. The brackets 17 and 18 have holes therein to permit cooling air to pass outwardly over the ends of the transformer coils.

The ends of the secondary windings 16, which are composed of copper bars bent to hair-pin shape, are brought out and terminals 26 and 27 are welded to the ends of each winding. The upper edges of the terminals are grooved as shown in Figures 1 and 4. The inner ends of the terminals 26 and 27 are likewise grooved for cooperation with a ring 28 formed integral with the spider 11. The ring has a continuous rim 29 projecting into the grooves formed on the ends of the terminals 26 and 27. The outer ends of the terminals 27 have a similar annular groove into which a projecting rim 30 on a collar 31 projects. The collar 31 rests on the reduced end of the spider 11 and a clamping nut 32 is threaded thereon. A conduit 33 for air currents is formed in the spider between the rings 28 and 30, said conduit extending through the ring 28, and the ring 31 may be suitably perforated to provide outlets for such currents. The terminals 26 and 27 are thus given a rigid support at both ends but are insulated from the clamping rings and from each other.

Figure 3:
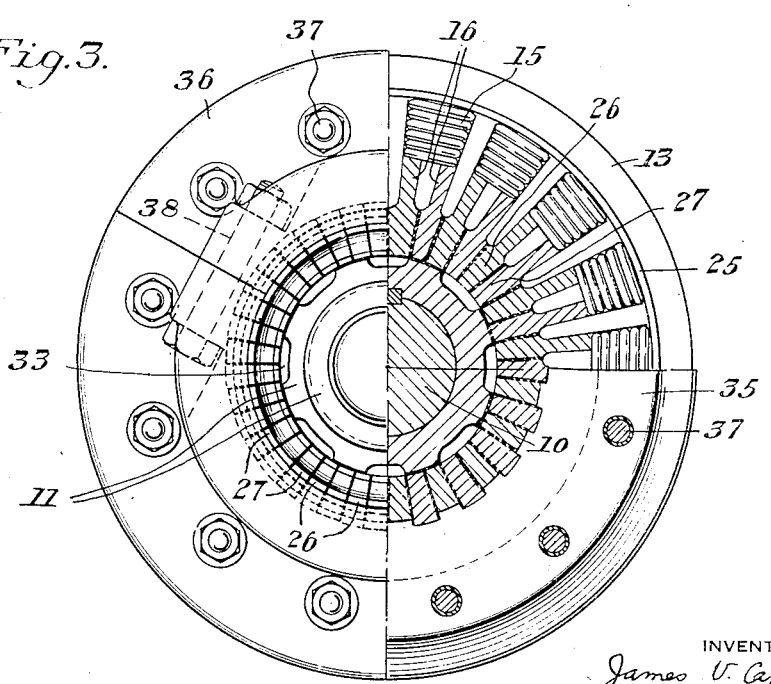
Figure 3 is an end elevation with parts removed and with parts shown in section along the line III—III of Figure 1.

The terminals 26 and 27 form substantially grooved cylinders of different diameters since they are arranged in a circle and, although they are not continuous around the circumference, they are close enough together to provide strong support for a welding electrode 34. The electrode 34 is made up of rolls 35 and 36. These rolls are insulated from each other but are secured together by bolts 37. Each roll 35 and 36 of the electrode 34 is further divided along a plane passing through the axis into two halves. These two halves are bolted together as shown in Figure 3 by bolts 38. The electrode is assembled by placing the two halves of the inner roll 35 upon the terminals 26 and bolting them together. The inner surface of the portions of the electrode are grooved for engagement with the grooved upper edges of the terminals 26. When both rolls of the electrode 34 have thus been positioned on the terminals 26 and 27, the two rolls are bolted together. The joints between halves of each roll of the welding electrode are not parallel but are at right angles to give greater rigidity to the assembled electrode.

The invention may be employed for the welding of single or double seam pipe. In welding single seam pipe, I preferably provide a duplicate transforming device and welding rolls arranged in a vertical plane with that already described. The spacing of the halves of the welding rolls of the lower transformer is preferably adjustable. The purpose of the second device is to supply current to the blank for normalizing purposes to remove strains induced in the bending or forming process. The amount of current supplied for this purpose may be varied by changing the spacing of the halves of the contact roller to change the resistance of the circuit and the normalizing temperature may thus be varied. In welding double seam pipe, the lower device and electrode rolls perform the same function as the upper or main transformer and roller, that is, to supply welding current to the abutting edges of the blank. In either case, side pressure rolls will be employed for exerting the pressure required to effect a homogeneous weld.

For controlling the normalizing current referred to above, I prefer to employ the automatic control equipment described and claimed in my Patent 2,009,685, granted July 30, 1935, for Apparatus for electric welding.

The primary windings of the transformers may be supplied with current through slip rings 15a. Since the supply is single phase, only two rings will be needed for energizing the primary windings. Additional rings may be provided for taps which may be taken from the primary windings for the purpose of voltage control.

Figure 6:
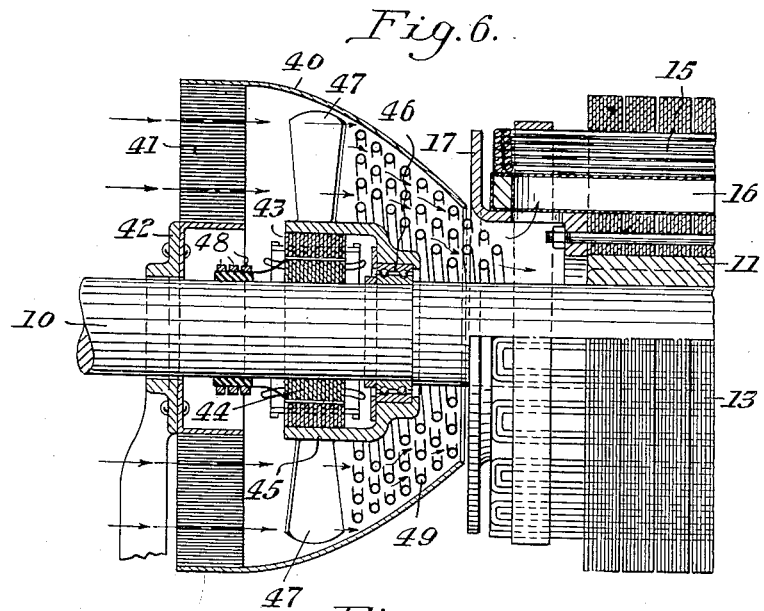
Figure 6 is a sectional view similar to Figure 1 showing in detail one form of cooling arrangement for the transformer.

Figure 6 illustrates a novel form of cooling device which I may employ in connection with the transformer hereinabove described. This cooling device includes a shell 40 surrounding the end of the core opposite that to which the welding electrode is secured. A filter 41 is placed in the end of the shell 40. A yoke 42 surrounding the shaft 10 supports the filter 41 and the shell 40. An induction motor 43 has its stator 44 secured to the shaft 10, while its rotor 45 is rotatable thereon by means of bearings 46. Fan blades 47 secured to the rotor set up a current of air as indicated by the arrows for the purpose of cooling the core and transformers. The location of the stator and rotor may, of course, be reversed from that shown. Current is supplied to the induction motor 43 through slip rings 48. A cooling coil 49 may be employed to lower the temperature of the cooling air to the desired point.

Figure 7:
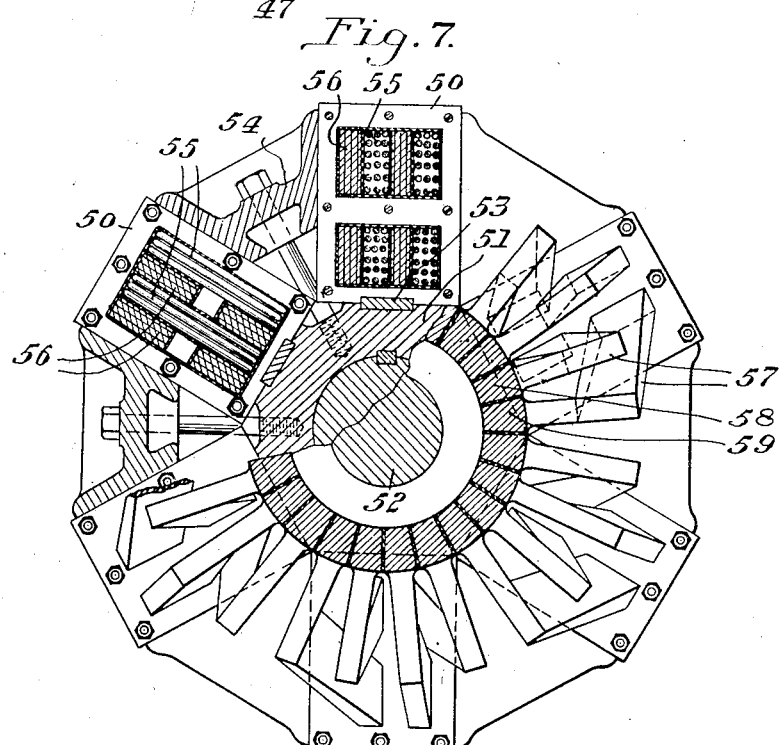
Figure 7 is an end elevation partly in section showing a modified form of the invention.

In Figure 7, I have illustrated a modified form of the invention according to which a plurality of independent shell type transformers 50 are secured to a common spider 51. The spider 51 is keyed to and rotates with a shaft 52. The transformers are keyed to the spider by means of keys 53. Clamping wedges 54 serve to space the transformers and clamp them to the spider. The transformer cores may be tapered or slotted for interlocking with the wedges to prevent the transformers from leaving the spider. The primary and secondary windings 55 and 56 of the transformers are arranged in sets and have their axes tangent to a circle circumscribed about the shaft 52. The secondary windings are composed of copper strap and have extensions 57 which are connected to terminals 58 and 59. The terminals 58 and 59 carry a divided welding electrode similar to that shown in 34 so that current induced in the transformer secondary windings is conducted to the formed blank in the same manner as previously explained. The two transformers shown in section in Figure 7 represent sections adjacent the end of the transformer and through the central portion thereof respectively.

Figure 8 illustrates a further modified form of the invention, in which the construction illustrated in Figures 1 through 5 is duplicated, except for the welding electrode, on both sides of the latter. The construction of the transformers and their connections to the contact rolls are identical with those already described. The clamping ring 31 is omitted and the secondary windings of all transformers have terminals directly engaging and supporting the halves of the welding electrode. The advantage of the construction shown in Figure 8 resides in the fact that because of its symmetrical arrangement, it may be readily designed to support the loads encountered in the operation thereof. Further advantage also lies in the ease with which the contact rolls may be cooled. Cooling air may be supplied at both ends of the device and after passing through the transformers, impinges upon the welding rolls. The latter are thus maintained at a safe operating temperature. The circulation of air currents is indicated generally by the arrows in Figure 8.

The construction described represents a marked improvement over those known heretofore, in that it is mechanically strong and rigid and, at the same time, permits easy access to all parts of the machine. The construction is also cheaper than those previously practiced. The electrical characteristics are also improved in that a positive contact between the welding roll and each transformer secondary is assured and substantially all reactance is eliminated from the secondary circuits. It is known that a shell type transformer has higher efficiency than other types, and as far as I am aware, I am the first to adapt this type of transformer for use in a rotary installation. Since the construction is entirely symmetrical about the axis of rotation, it will be apparent that the device is well adapted to withstand electro-mechanical strains which might be set up incident to the flow of the heavy currents employed in electric welding. The shape of the transformer core makes it unnecessary to provide special bracing for the windings thereof and the forces resulting from the flow of current are balanced out in the unit itself and are not transmitted to the bearings or foundation members. The transformers can easily be ventilated so as to prevent overheating. The ventilating system also serves to cool the welding rolls which are constantly carrying heavy current and in mechanical engagement with the blank being welded.

Although I have described a few forms of the invention, it is obvious that it may be embodied in other forms than those shown. For this reason I do not intend to be limited to the specific details described and illustrated and any changes in the invention as disclosed may be made without departing from the spirit thereof as defined by the appended claims.

I claim:

1. In a welder, a drum-shaped transformer core adapted for rotation, primary and secondary windings passing axially therethrough, and means connected to the secondary windings for supplying welding current to opposite edges of a joint to be welded.

2. The combination with a rotatable shaft, electrode rolls thereon for engaging and supplying welding current to abutting edges of formed skelp, of a cylindrical transformer core on said shaft co-axially thereof and rotating therewith, axial slots in said core, primary and secondary windings in said slots, and means for connecting the ends of said secondary windings alternately to said rolls.

3. In a welding device, the combination with an electrode including two cooperating rolls mounted on a shaft, of a transformer having a cylindrical core mounted co-axially of the shaft and laterally of the rolls, and connections from the transformer windings to both the rolls, comprising insulated segments arranged co-axially with said core and alternately engaging said rolls.

4. A welding machine comprising a shaft, electrode rolls thereon, an axially slotted cylindrical core on said shaft, transformer windings in said core and connections from said windings to said rolls.

5. In a welder, electrode rolls, a transformer for supplying current thereto, having its axis parallel to but spaced from that of the rolls, the transformer being positioned laterally of said rolls, and interleaved connections between the transformer and said rolls.

6. In a welder, electrode rolls, a transformer rotatable therewith and a plurality of axially disposed members with radial projections extending from the transformer, said projections electrically engaging said rolls.

7. In a welder, electrode rolls, a transformer rotatable therewith, a plurality of lateral extensions from the transformer disposed around the shaft, said extensions having radial projections forming discontinuous circumferential surfaces, said rolls electrically engaging said continuous surfaces.

8. The combination with a rotatable shaft, transformers mounted on said shaft, electrode discs on the shaft, and axial extensions from the transformers disposed around the shaft, with a circumferentially continuous space between the shaft and the extensions, said extensions alternately engaging said discs.

9. In a welder, electrode rolls, a transformer rotatable therewith and coaxial to said rolls, lateral extensions axially disposed on the transformer and projecting through said rolls, said extensions alternately engaging one of said rolls and being connected to transformer terminals of similar polarity.

10. In a welder, transformers mounted on a shaft, electrode rolls therebetween, a pair of opposed fluid manifolds concentric to the shaft for supplying cooling fluid in a direction toward the electrode rolls, cooling ducts parallel to the shaft and radial discharge passages for said fluid between the transformer and electrode wheel.

11. In a welder, a shaft, electrode rolls thereon, a drum core on said shaft having axial slots, windings in said slots forming a plurality of transformers, the secondary windings being formed of looped copper straps having their free ends formed to engage said rolls.

12. In a welder, electrode rolls, a transformer rotatable therewith having a cylindrical core coaxial with said rolls, and windings axially disposed in the core and connected to said rolls.

13. A welder comprising electrode rolls, and a transformer for supplying welding current thereto including a cylindrical core coaxial with but positioned laterally of said rolls, and windings embedded in said core and connected to said rolls.

14. The combination, in a welder, with electrode rolls mounted on a shaft, of transformer windings connected to said rolls, and a magnetic core surrounding said windings, axially disposed on said shaft laterally of said rolls.

15. In a welder, a rotatable electrode comprising contact rolls, transformers on both sides of the electrode, having windings connected to the rolls so as to rotate therewith, and being disposed laterally of the rolls, and magnetic cores surrounding said windings.

16. In a welder, a rotatable electrode comprising contact rolls, transformer windings for supplying welding current thereto, and a drum-shaped core rotatable with said rolls and enclosing said windings.

17. A rotating welder comprising a shaft, two cooperating electrode rolls surrounding the shaft, a plurality of transformers carried on said shaft laterally of said rolls, for supplying welding current directly thereto, and means for connecting the transformer secondaries to the rolls comprising a plurality of spaced conducting segments arranged in cylindrical form, each alternate segment engaging one of said rolls.

18. In a welding device, a transformer core mounted for rotation, primary and secondary windings symmetrically disposed on said core, terminals for said secondary windings comprising cylindrically arranged segments insulated from each other, and contact rolls adapted to be engaged by alternate segments.

19. In a welding transformer, an annular core mounted on a shaft for rotation, primary and secondary windings traversing axial slots in said core, electrode rolls on said shaft, and terminals of opposite polarity on said secondary windings alternately engaging said rolls for supplying welding current thereto.

20. In a welding transformer, an annular core mounted on a shaft for rotation, primary and secondary windings traversing axial slots in said core, electrode rolls on said shaft, each of said secondary windings having terminals engaging both of said rolls.

21. In a welder, an electrode comprising two cooperating rolls, a plurality of transformers for supplying welding current to the rolls, a shaft for rotatably supporting the rolls and transformers, the transformers being disposed laterally of the rolls, and segments cylindrically arranged within the rolls alternately engaging said rolls, respectively, for connecting the transformer windings thereto.

22. In a welder, a shaft, electrode rolls thereon, a plurality of transformers positioned on the shaft laterally of the roll and arranged symmetrically about the shaft, and an annular conduit extending around the shaft axis for supplying a cooling fluid axially of the said transformers and rolls.

23. A rotary welding device comprising a shaft, transformers arranged thereon in two spaced groups, a welding electrode therebetween comprising conducting discs in side by side relation of a diameter at least equal to that of the transformer groups, and a plurality of individual connections spaced radially from the shaft between the windings of the transformers in both of said groups and both of said discs.

24. In a welding machine, a transformer mounted on a shaft and rotating therewith, electrode discs on the shaft, and conducting bars extending from opposite terminals of the transformer to the electrode rolls, said bars being so disposed relative to each other as to neutralize substantially the magnetic flux therebetween.

25. In a welder, a rotatable electrode comprising conducting discs, transformers on both sides of the electrode, and a plurality of separate connections between terminals of the transformers of both polarities and the discs, said connections extending parallel to the shaft but spaced therefrom.

26. A pipe welding device including a shaft, an electrode comprising a pair of cooperating discs, transformers on the shaft on both sides of the electrode having terminals of opposite polarities, a plurality of conducting members parallel to the shaft but spaced radially thereof, connected to terminals of both polarities and extending through and on both sides of the electrode, a plurality of said members electrically engaging each disc.

27. In a welder, a shaft, electrode discs supported on said shaft side by side and insulated from each other, transformers mounted on said shaft on both sides of the discs, and terminals of both polarities extending from the secondary windings of the transformers, a plurality of said terminals of both polarities electrically engaging each disc.

28. In a welder, a shaft, electrode rolls thereon, a transformer rotatable with said rolls and shaft, and a pair of leads of opposite polarity extending from the transformer side by side and spaced radially of the shaft, said leads being connected to said electrode rolls respectively.

29. In a welding device, a rotatable shaft, a plurality of transformers mounted on said shaft in two groups spaced along the shaft, electrode rolls therebetween, and a plurality of separate connections extending from both ends of the secondary windings of the transformers of both groups to and through both of said rolls, whereby to connect said windings in parallel to said rolls.

30. A welder comprising a shaft, a plurality of independent transformers secured to said shaft in two symmetrical, spaced groups, electrode rolls on said shaft between said groups, and a pair of connections extending from each of the secondary windings of said transformers to said rolls respectively, said connections being substantially equally spaced radially from the shaft.

31. A rotatable welding apparatus including a shaft, transformers disposed in spaced-apart relation about the shaft in two groups spaced along the shaft, electrode rolls positioned between said groups, and a pair of connections from the secondary winding of each of the transformers to the electrode rolls respectively, said connections including means extending through the rolls whereby transformers on opposite sides of the electrode rolls may be connected in parallel thereto.

32. A welding electrode comprising a pair of juxtaposed discs mounted for rotation, a plurality of transformers rotatable with the electrode, and separate terminals extending axially of the electrode in spaced relation, a plurality of said terminals having contact with each disc, and being connected to the windings on said transformers.

33. Rotary welding apparatus comprising a shaft, a plurality of separate transformers each having its own independent core and windings, spaced circumferentially about said shaft, an electrode roll mounted on said shaft adjacent said transformers, and separate connections from terminals of opposite polarity of each of said transformers to opposite sides of said electrode.

34. The apparatus defined by claim 33 wherein there are two groups of transformers arranged in circumferentially spaced relation on said shaft, the electrode roll being disposed between said groups, a plurality of separate, independent connections extending through said electrode and affording terminals on each side thereof for the connection of transformer terminals of opposite polarity.

35. A rotatable welding apparatus including a plurality of separate, independent transformers in circumferentially spaced relation about the axis of rotation, an electrode roll positioned beside and coaxially of said independent transformers, and connections from the transformers to the electrode roll.

36. A rotatable welding apparatus including a shaft, independent transformers disposed in circumferentially spaced relation about the shaft in two spaced groups, an electrode roll positioned between said groups, and connections from the transformers to the electrode roll.

37. A rotatable welding apparatus including a shaft, individual transformers with separate cores and windings disposed in spaced relation about the shaft in two spaced groups, an electrode roll positioned between said groups, and connections from the transformers to the electrode roll.

38. In a welding machine, the combination with a shaft, and transformers carried by said shaft in spaced relation, longitudinally thereof, of electrode rolls of different instantaneous polarity between said transformers, and means extending through said rolls for connecting the secondary terminals of one polarity of the transformer on one side of the rolls to the secondary terminals of the same polarity of the transformer on the other side of the rolls, said means being connected to the electrode roll of said polarity.

39. A welder comprising a shaft, a transformer mounted thereon, electrode rolls on said shaft and connections extending from terminals of each polarity of the secondary winding of the transformer to said rolls respectively, said connections being substantially equidistant radially from the shaft.

JAMES V. CAPUTO.